(12) United States Patent
Kurihara et al.

(10) Patent No.: US 8,226,837 B2
(45) Date of Patent: Jul. 24, 2012

(54) MOLD FOR OPTICAL DEVICE WITH ANTI-REFLECTION STRUCTURE, METHOD FOR PRODUCING THE SAME, AND OPTICAL DEVICE

(75) Inventors: Kazuma Kurihara, Tsukuba (JP); Takayuki Shima, Tsukuba (JP); Junji Tominaga, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 498 days.

(21) Appl. No.: 12/515,188

(22) PCT Filed: Oct. 2, 2007

(86) PCT No.: PCT/JP2007/069279
§ 371 (c)(1),
(2), (4) Date: May 15, 2009

(87) PCT Pub. No.: WO2008/059671
PCT Pub. Date: May 22, 2008

(65) Prior Publication Data
US 2010/0055397 A1  Mar. 4, 2010

(30) Foreign Application Priority Data

Nov. 15, 2006 (JP) .............................. 2006-308842
Apr. 19, 2007 (JP) .............................. 2007-110068

(51) Int. Cl.
*B29D 11/00* (2006.01)
(52) U.S. Cl. ................. 216/24; 216/25; 216/41; 216/80; 438/717
(58) Field of Classification Search .................... 216/24, 216/25, 26, 97, 99, 80; 438/717, 723
See application file for complete search history.

(56) References Cited

U.S. PATENT DOCUMENTS

| 6,343,178 | B1* | 1/2002 | Burns et al. ................... 385/140 |
| 6,514,674 | B1 | 2/2003 | Iwasaki |
| 2003/0102286 | A1 | 6/2003 | Takahara et al. |
| 2006/0014001 | A1* | 1/2006 | Zhang et al. ............... 428/195.1 |

FOREIGN PATENT DOCUMENTS

| JP | 2000-258607 | 9/2000 |
| JP | 2001-272505 | 10/2001 |
| JP | 2003-066203 | 3/2003 |
| JP | 2003-285334 | 10/2003 |
| JP | 2004-237526 | 8/2004 |
| JP | 2005-331868 | 12/2005 |
| JP | 2006-171219 | 6/2006 |
| JP | 2006-243633 | 9/2006 |

* cited by examiner

*Primary Examiner* — Lan Vinh
(74) *Attorney, Agent, or Firm* — Venable LLP; Michael A. Sartori; Ryan M. Flandro

(57) ABSTRACT

A process for producing through simple operations a molding die for optical device having an antireflective structure of nano-order microscopic uneven plane on a substratum surface. The molding die for optical device having microscopic uneven plane (antireflective structure die plane) on a surface of substratum is produced by a process comprising forming one or more etching transfer layers on substratum; forming thin film for formation of semispherical microparticles on the etching transfer layers; causing the thin film to undergo aggregation, or decomposition, or nucleation of the material by the use of any of thermal reaction, photoreaction and gas reaction or a combination of these reactions so as to form multiple semispherical islandlike microparticles; and using the multiple islandlike microparticles as a protective mask, carrying out sequential etching of the etching transfer layers and substratum by reactive gas to thereby form a conical pattern on the microscopic surface of the substratum.

7 Claims, 7 Drawing Sheets

(a)

(b)

MOLD FOR OPTICAL DEVICE WITH ANTI-REFLECTION STRUCTURE, METHOD FOR PRODUCING THE SAME, AND OPTICAL DEVICE

TECHNICAL FIELD

The present invention relates to a mold for an optical device such as a light emitting device, a photo acceptance device and an anti-reflection coating with an anti-reflection structure, a method for producing the same and an optical device.

BACKGROUND ART

Conventionally, an optical device composed of glass or the like is subjected to surface treatment for reducing return light by surface reflection and for increasing transmitted light. As a specific method of this surface treatment, there is known a method of forming fine and dense depressions and elevations on a surface of the optical device.

In a case of thus forming the depressions and elevations in a periodic pattern on the surface of the optical device, light is diffracted when the light transmits through the surface of the optical device to greatly reduce straight components of the transmitted light. However, when the depressions and elevations formed on the surface of the optical device is formed in a rectangular shape in such a manner that a pitch thereof is shorter than a wavelength of the transmitting light, the light is not diffracted. Therefore, it is possible to obtain an anti-reflection effect effective to the light with a single wavelength corresponding to the pitch, a depth or the like of the depressions and elevations.

Furthermore, it is known to be able to obtain an anti-reflection effect also to light with a wide range of wavelength by forming the depressions and elevations to be not in a rectangular shape, but in a so-called conical shape (conical pattern) in which the ratio of the crest-side volume by the material of the optical device to trough-side volume by air continuously varies (for example, refer to Patent Document 1 and Patent Document 2).

For carrying out a structure with anti-reflection to such a wide range of wavelengths, a fine pattern having less than the wavelength is required. Accordingly, there is known a method of using an electronic beam lithography technology for producing such a fine structure. This method is a method in which after coating a substrate with electron resist, the electron beam is used to perform patterning thereon, and reflective etching is used to etch the substrate.

Furthermore, it is known that organic colloid is used to produce a nano periodic structure, thus obtaining an anti-reflection structure (for example, refer to Patent Document 3). The producing method using the organic colloid is a method in which the organic colloid is mixed into a solution, the colloid is coated on the surface of the substrate and a structure is produced by reflective etching based upon colloid beads in such a manner as to form a fine structure with a wavelength or less as a target, thus forming the anti-reflection structure.
Patent Document 1: Japanese Patent Application Laid-Open No. 2001-272505
Patent Document 2: Japanese Patent Application Laid-Open No. 2006-243633
Patent Document 3: Japanese Patent Application Laid-Open No. 2005-331868

DISCLOSURE OF THE INVENTION

Problem to be Solved by the Invention

However, since the method of producing the anti-reflection structure using the electron irradiation device requires a scan with the electronic beams for patterning, the drawing throughput is extremely slow to need time for the pattern formation. In consequence, there occurs the problem with an increase in cost for applying it to the optical device with an increased area.

Furthermore, the method of producing the anti-reflection structure using the organic colloid as a protection mask can form a periodic nano structure with a large area at a high speed, but it is difficult to uniformly form the organic colloid on the large area and also to form a single uniform layer.

Further, since the method of producing the anti-reflection structure using the organic colloid as the protection mask requires coating of the organic materials dispersed in the liquid, in a case where the coating is applied to a structure with an complex structure, there occur variations in film thickness of the organic materials to be coated, thereby occurring the problem with degradation of optical properties.

The present invention has an object of solving the above problem and an issue of the present invention is in a point of carrying out a mold for an optical device with the following nano structure, a mold for the nano structure, a method of producing the mold for the optical device with the nano structure and the mold for the nano structure, and an optical device with the nano structure.
(1) A mold for an optical device according to the present invention can produce an optical device including a uniformly stable nano structure and including an anti-reflection structure with an anti-reflection effect in a wider wavelength band region and with little dependency on an incident angle, on a surface of the optical device formed of a structure with a large area and a complex shape.
(2) A method of producing a mold for an optical device according to the present invention is a method of being capable of producing it with a fewer steps and with only dry processes in high productivity.
(3) The optical device of the present invention is an optical device including a nano pattern having a nano structure of a fine depressed and elevated surface formed on the surface of a substrate and arranged at a random, preferably this nano pattern being constructed in such a manner as to hold an interval having a wavelength or less of a light source.

Means for Solving the Problem

The present invention is, for solving the above problem, a method of producing a mold for an optical device for molding the optical device with an anti-reflection structure of a fine depressed and elevated surface formed on a surface of a substrate, and provides the method of producing the mold for the optical device with the anti-reflection structure comprising forming one or more etching transfer layers on the substrate, forming a thin film to form island-like fine particles on the etching transfer layer, using any one of a thermal reaction, a photoreaction, a chemical reaction or a combination of these reactions to cause aggregation, decomposition, or nucleation of a thin film material, thereby forming plurality of island-like fine particles on the thin film, using the plurality of the island-like fine particles as a protection mask, carrying out etching of the etching layer and the substrate in order, and forming an elevation pattern on the fine surface of the substrate.

It is preferable that the plurality of the island-like fine particles each have a size in the order of nano meters and form a nano pattern in such a manner as to be arranged at a random while holding an interval having a wavelength or less of light to be reflected as a target, with each other.

According to an embodiment, a material of the thin film is made of a material containing silver, gold, platinum, or palladium as a main component, or an oxide or a nitride containing any one of silver, gold, platinum, palladium, tungsten, bismuth, and tellurium as a main component.

According to an embodiment, the island-like fine particle has an average particle size of 5 nm to 1000 nm and an average interval between the island-like fine particles is in a range of 10 nm to 2000 nm.

The substrate is preferably made of a metal or a non-metal containing silica glass, resin, silicon, gallium nitride, gallium arsenide, indium phosphor, nickel, iron, titanium, carbon, sapphire or carbon nitride as a main component.

The etching layer is preferably composed of one layer made of an oxide, a nitride or a carbide, or multiple layers made of any of the oxide, the nitride and the carbide.

The present invention, for solving the above described problem, provides a mold for an optical device with an anti-reflection structure produced by the method of producing the mold for the optical device.

The present invention, for solving the above described problem, provides an optical device comprising a nano pattern having a nano structure of a fine depressed and elevated surface formed on a surface of a substrate and arranged at a random.

It is preferable that the nano pattern of the optical device with the nano structure is composed of in such a manner as to hold an interval having a wavelength or less of a light source.

Effect of the Invention

The following effect occurs according to the present invention.
(1) The mold for the optical device according to the present invention can produce the optical device including the uniformly stable nano structure to have an anti-reflection effect in a wider range of wavelengths and including the anti-reflection structure with little dependency on an incident angle, on the surface of the optical device with a large area and a complex free curved surface.
(2) The method of producing the mold for the optical device according to the present invention can produce with a fewer steps and with only dry processes in high productivity.
(3) The optical device according to the present invention is an optical device including the nano pattern having the nano structure of the fine depressed and elevated surface formed on the surface of the substrate and arranged at a random, preferably this nano pattern being composed of in such a manner as to hold an interval having a wavelength or less of a light source.

EXPLANATION OF REFERENCE NUMERALS

Figure 1:
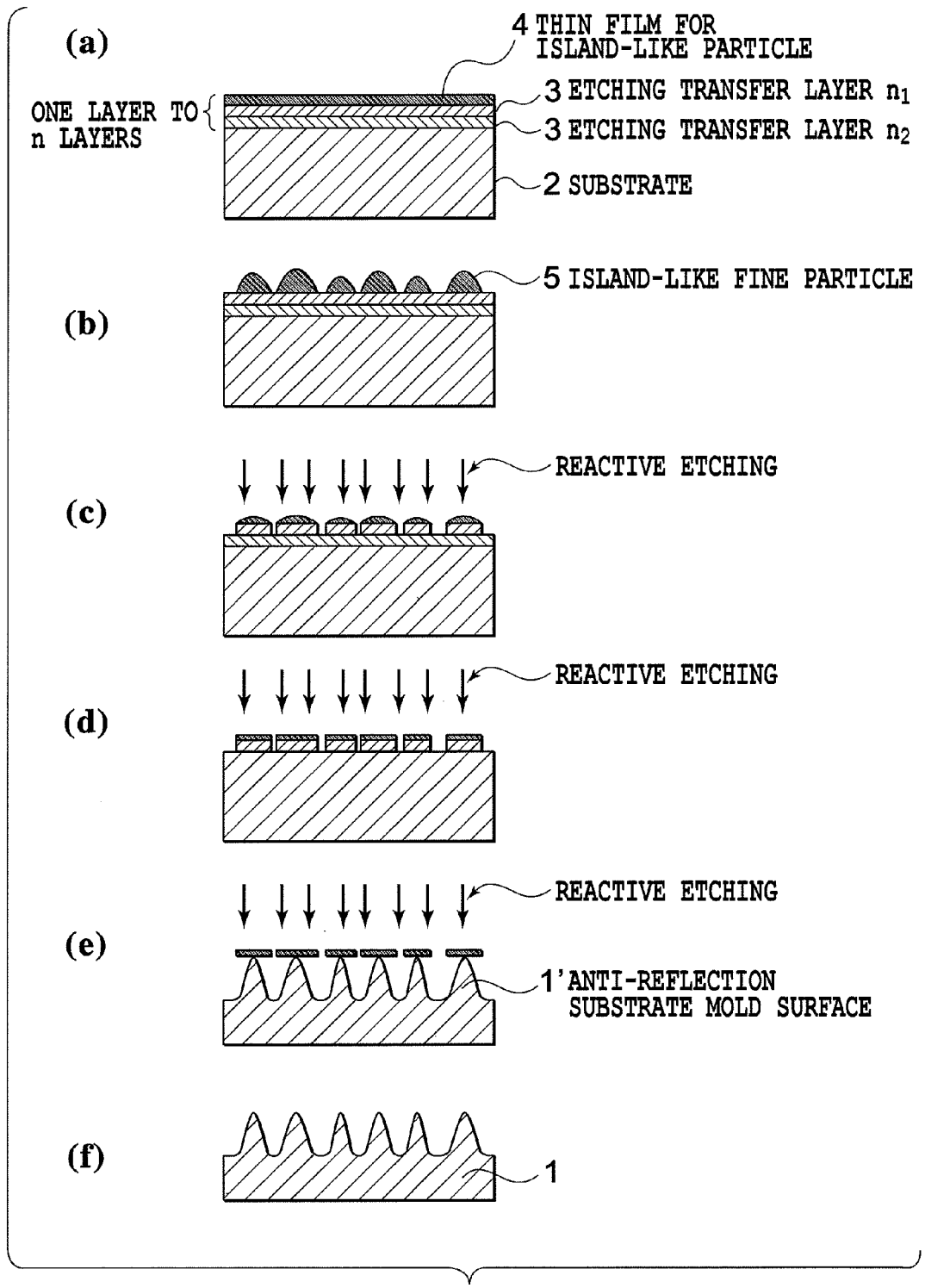
FIG. 1 is diagrams explaining Example 1 in the present invention.

1: MOLD FOR OPTICAL DEVICE
2: SUBSTRATE
3: ETCHING TRANSFER LAYER
4: THIN FILM FOR PRODUCING ISLAND-LIKE FINE PARTICLE
5: ISLAND-LIKE FINE PARTICLE
6: MOLD FOR OPTICAL DEVICE
7: SUBSTRATE
8: INJECTION MOLD
9: OPTICAL DEVICE
10: INJECTION MOLD
11: OPTICAL DEVICE

BEST MODE OF CARRYING OUT THE INVENTION

The best mode of carrying out a mold for an anti-reflection device, a method of producing the mold for the optical device and an optical device according to the present invention will be explained based on examples with reference to the drawings.

The present invention relates to a mold for an optical device for mold an optical device including a fine depressions and elevations structure (anti-reflection structure) for obtaining an anti-reflection effect on a surface of the optical device and a method of producing the mold. The steps in the method of producing the mold for the optical device according to the present invention are as follows.
(1) Steps of Forming a Thin Film on a Substrate
Plurality of etching transfer layers are formed on the substrate and a thin film is further formed at a time. These forming steps are carried out by a vacuum dry process.
(2) Formation of a Nano Pattern
Any of heating reaction, photoreaction and gas reaction or the combined reaction as a combination of two or more of these reactions is used to cause aggregation, decomposition or nucleation of the thin film material to form a nano pattern in the thin film in which a nano-order semispherical island-like fine particles exist at a random by an interval having a wavelength or less of light as a target of anti-reflection.

The material of the island-like fine particle is made of a material containing any one of silver, gold, platinum and palladium as a main component, or an oxide material or a nitride containing any of silver, gold, platinum, palladium, tungsten, bismuth and tellurium as a main component, and thereby it is possible to form the nano pattern in which an interval between the plurality of island-like fine particles is narrow. At this time it is preferable that the island-like fine particle has an average particle size of 5 nm to 1000 nm and an average interval between the adjacent island-like fine particles is in a range of 10 nm to 2000 nm.
(3) By using the nano pattern formed, that is, by using the island-like fine particles as a protection mask, the etching transfer layer is etched. Further, the substrate as a target is finally etched to form a fine conical nano structure on the surface of the substrate, thus producing a mold for an optical device with an anti-reflection structure.

In this case, since the plurality of etching transfer layers are provided between the island-like material and the substrate as described above, it is possible to efficiently produce the fine depressed and elevated surface (anti-reflection structure mold surface), which can mold the optical device equipped with the reflection structure of a high aspect ratio, on the surface of mold for the optical device.

Use of this mold for the optical device, as explained in the following examples, enables the optical device including the nano pattern having the nano structure of the fine depressed and elevated surface formed on the surface of the substrate and arranged at a random, preferably this nano pattern being composed in such a manner as to hold an interval having a wavelength or less of a light source.

EXAMPLE 1

Example 1 of a mold for an optical device according to the present invention and a method of producing the same will be in detail explained with reference to the drawings. FIG. 1 is diagrams explaining the steps of a producing method of producing a mold 1 for an optical device according to Example 1 of the present invention by using a reactive ion etching method.

(1) A film forming device (not shown in drawings) is used to form one or more etching layers 3 and a thin film 4 for producing island-like fine particles on a surface of a flat substrate 2 (FIG. 1(a)). The present inventors have confirmed by actual tests that the material containing silver, gold, platinum or palladium as a main component is effective as a material of the thin film 4 for forming island-like fine particles 5 at a random by an interval of a wavelength or less of light as an anti-reflection target on the surface of the substrate 2.

Figure 2:
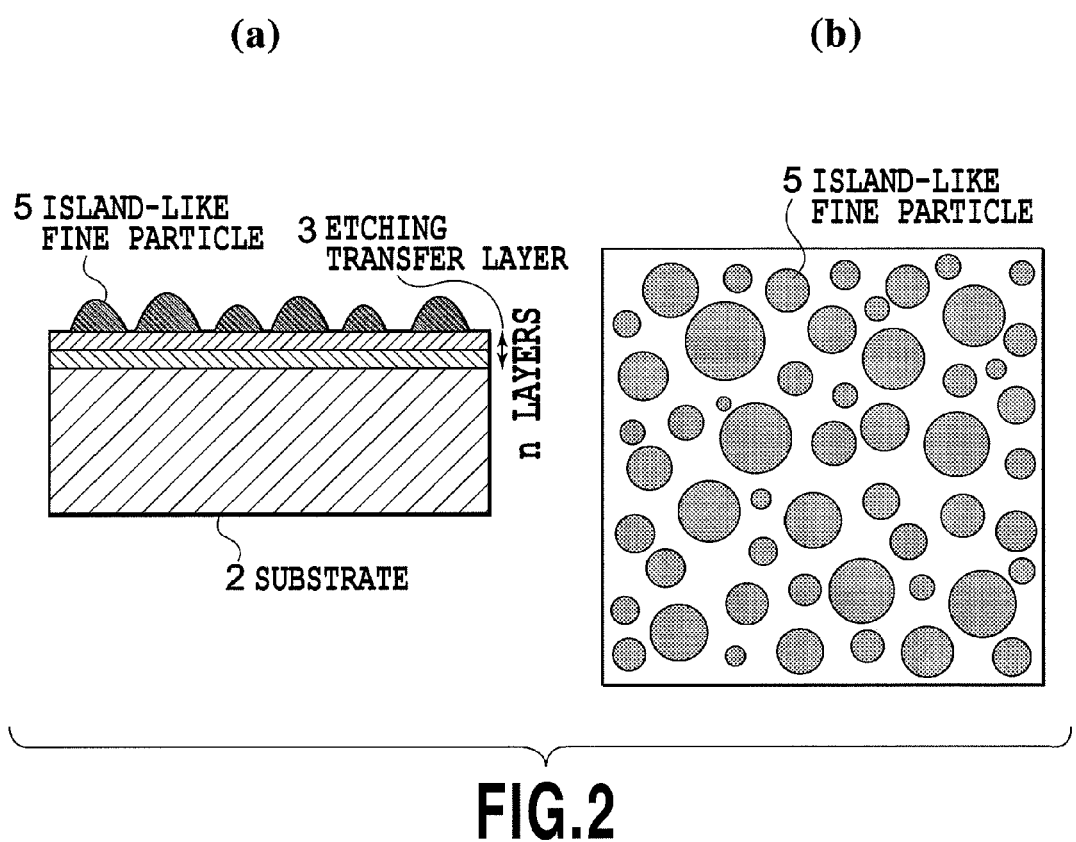
FIG. 2 is diagrams explaining Example 1 in the present invention.

(2) Next, the island-like fine particles 5 are produced using aggregation, nucleation or decomposition so as to be arranged at a random by the interval of the wavelength or less (FIG. 1(b)). FIGS. 2(a) and (b) are a cross section and a plan view each showing the substrate 2 and island-like fine particles 5 formed on the etching transfer layer 3.

Incidentally, a heating reaction, a photoreaction, a gas reaction or the like become a parameter to control an aggregation reaction or a nucleation reaction of the material and thereby it is possible to control an average particle size and an interval of the island-like fine particles 5. Furthermore, the present inventors have confirmed that it is possible to control the average particle size and the interval of the island-like fine particles 5 by adding impurities to the material of the thin film 4.

Furthermore, in a case of using an oxide containing any one of silver, gold, platinum, palladium, tungsten, bismuth and tellurium as a main component, it is possible to control the average particle size and the interval of the island-like fine particles 5 by using a heating reaction, a photoreaction or gas decomposition reaction.

(3) Next, the formed island-like fine particles 5 are used as a mask to etch the etching transfer layer 3 with a reactive gas (for example, $CF_4$, $CHF_3$, $CH_4$, $CF_6$, $H_2$, CO, $NH_3$, $Cl_2$ or $BCl_3$) (FIG. 1(c)). Here, the etching layer 3 is etched to maintain a shape similar to that of the island-like fine particles 5 and serves sequentially as a masking layer for the next etching transfer layer 3 or the substrate 2.

Upon forming a substantially conical fine depressed and elevated surface (anti-reflection structure mold surface) 1' for forming an anti-reflection structure of the optical device surface, on the surface of the substrate 2 using the island-like fine particles 5, the etching transfer layer 3 is, as described above, provided, and thereby it is possible to produce the structure having the substantially conical shape with high aspect ratio. As a material of the etching transfer layer 3, for example, in a case of using the island-like fine particle 5 containing silver as a main component, as a masking layer, a material containing carbon as a main component, or silicon, silicon oxide or silicon nitride is effective.

Here, in a case where the island-like fine particle 5 is made of silver as a main component, the etching transfer layer 3 is made of carbon and the substrate 2 is made of silica, the reactive etching is carried out using the gas and so on in such a manner as to meet a condition of "an etching speed of the island-like fine particle 5<<an etching speed of the etching transfer layer 3". In consequence, the island-like fine particle 5 creates a masking effect, thus making it possible to form a pattern on the etching transfer layer 3.

Next, in a case of etching the etching transfer layer 3 and the substrate 2, the reactive etching is carried out using the gas and so on in such a manner as to meet a condition of "an etching speed of the etching transfer layer 3<<an etching speed of the substrate 2". In consequence, it is possible to produce a substantially conical anti-reflection structure on the surface of the substrate using the island-like fine particle 5 as a mask. Further, the etching transfer layer 3 is not necessarily a single layer and may be formed in multiple layers depending on the process design for the etching.

As to the second and the subsequent etching transfer layers, the similar process is carried out (FIG. 1(d)) and finally the substrate 2 is etched, thus forming the mold 1 for the optical device in which the substantially conical fine depressed and elevated surface (anti-reflection structure mold surface) 1' is formed on the surface of the substrate 2 (FIG. 1(f)).

By using the above producing method, the mold can have the fine depressed and elevated structure formed in a substantially conical shape at a random by an interval of a wavelength or less of light as an anti-reflection target on the surface of the substrate 2 only by the dry process. Thereby, it is possible to easily produce also an optical lens having a complex shape and simplification of the producing process can be carried out.

Figure 3:
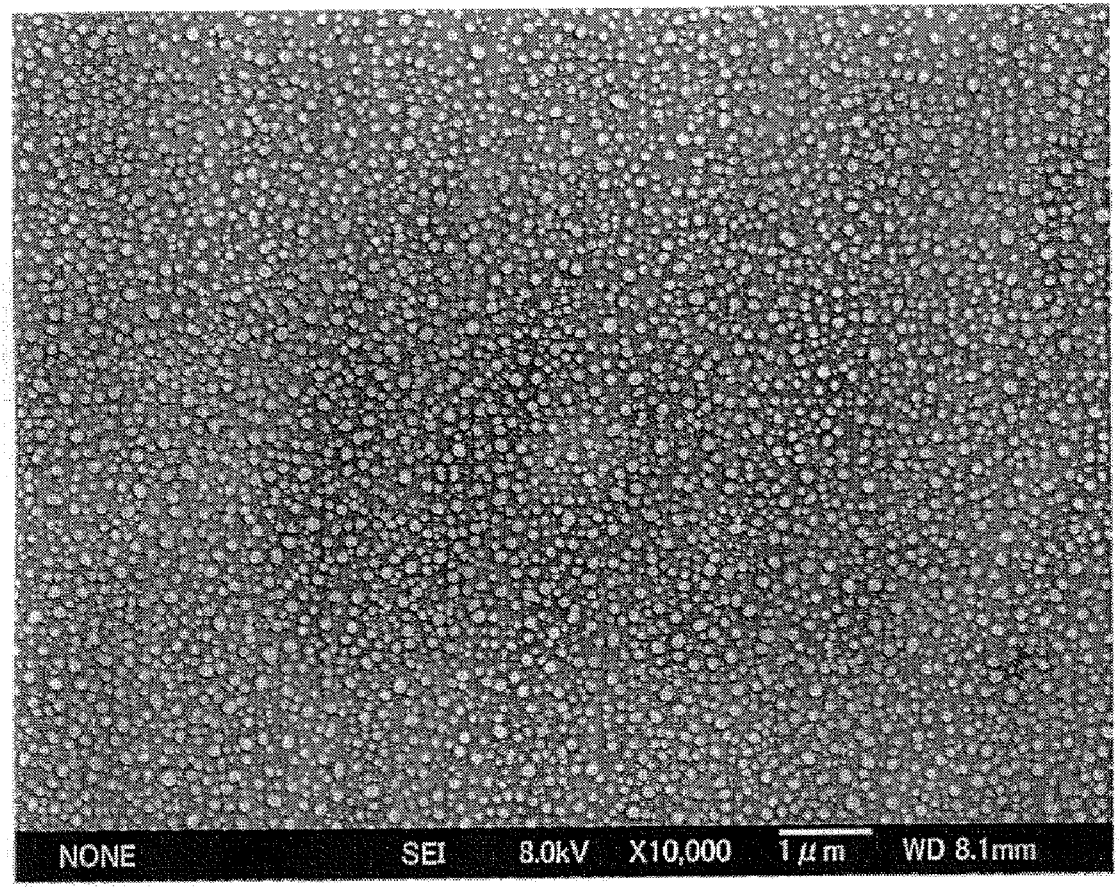
FIG. 3 is a diagram explaining Example 1 in the present invention.

FIG. 3 shows an SEM image (scanning electronic microscope image) representative of the island-like fine particles 5 obtained by carrying out Example 1 by the present inventors. In consequence, it was confirmed to be capable of forming the island-like fine particles 5 at a random by an interval of a wavelength or less of light as an anti-reflection target on the surface of the substrate 2. Furthermore, it was confirmed from this SEM image that as an effective material of the thin film 4, the material containing silver as a main component was effective by Example 1.

Furthermore, the present inventors have confirmed through the actual testing of Example 1 that the heating reaction, the photoreaction or the gas reaction is controlled to control the aggregation reaction or the nucleation reaction of the material and thereby it is possible to control the average particle size and then interval of the island-like fine particles 5. Furthermore, the present inventors have confirmed that it is possible to control the average particle size and the interval of the island-like fine particles 5 by adding impurities to the material.

Furthermore, the present inventors have confirmed that even in a case where an oxide containing any of gold, platinum, palladium, tungsten, bismuth, and tellurium as a main component is used as the thin film forming the island-like fine particles 5, it is possible to control the average particle size and the interval of the island-like fine particles 5 by using the heating reaction, the photoreaction or the gas decomposition reaction.

Figure 4:
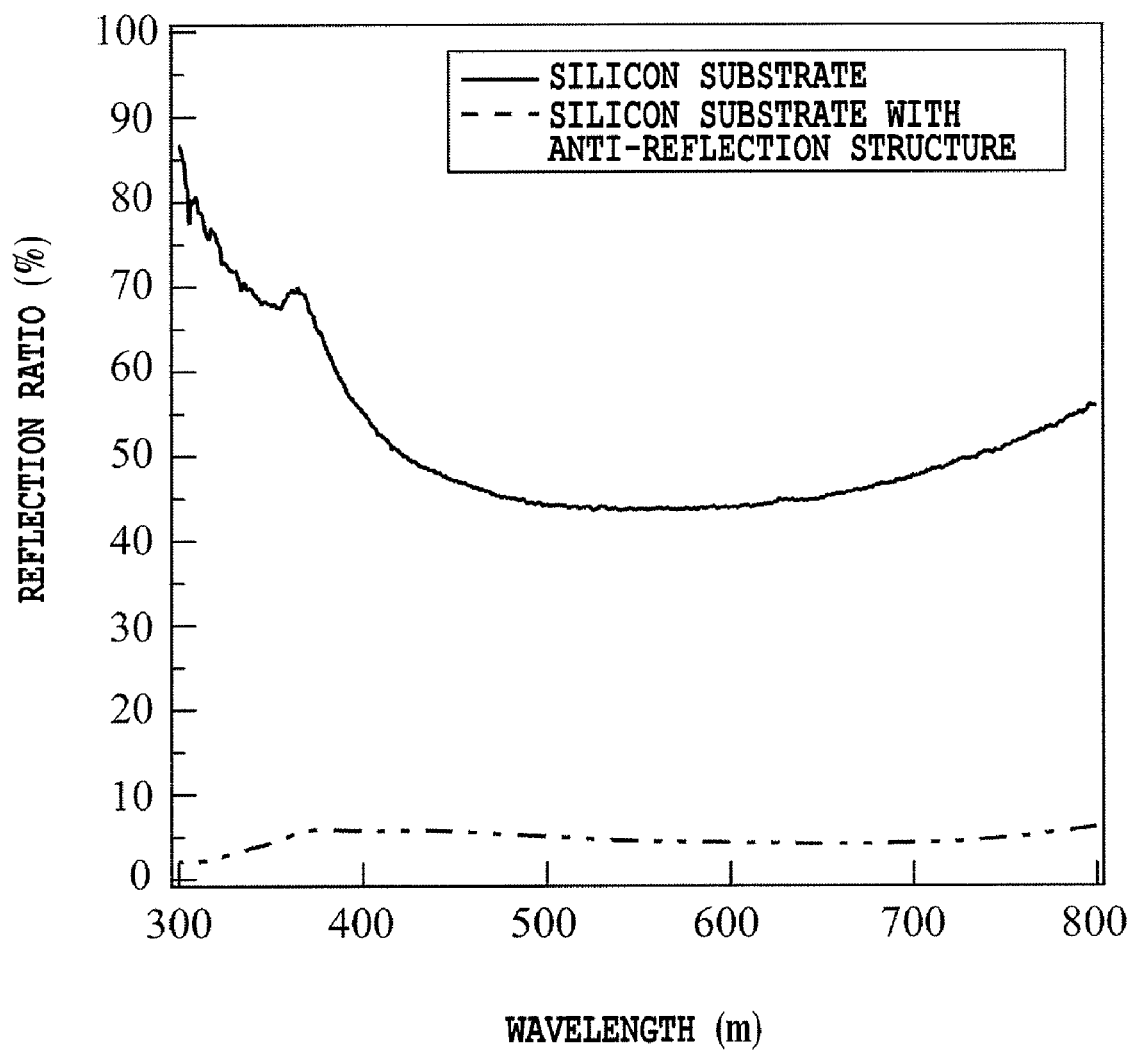
FIG. 4 is a graph explaining Example 1 in the present invention.

FIG. 4 is a graph of reflective characteristics in the mold 1 for the optical device (not the optical device itself) produced by using the mold 1 for the optical device produced by Example 1. That is, FIG. 4 is a graph of the reflective characteristics in the mold 1 for the optical device in which the island-like fine particles 5 shown in FIG. 3 are used as the masking layer to form the substantially conical fine depressed and elevated surface (anti-reflection structure mold surface) 1' on the surface of the silicon substrate 2 by using the process shown in FIG. 1.

From this graph, it was confirmed that reflection of about 50% on the plane of the mold 1 for the optical device made of silicon could be reduced to 5% or less by the mold 1 for the optical device according to the present invention. From this event, it was confirmed that the present invention was a method excellent in low cost and productivity since the substantially conical fine depressed and elevated surface (anti-reflection structure mold surface) 1' could be produced on the surface of the substrate 2 only by the dry process.

Furthermore, it was confirmed that the similar effect was obtained in a case where silica, glass, resin such as polycarbonate or PMMA, gallium nitride, gallium arsenide, indium phosphor, nickel, iron, titanium, carbon, sapphire, carbon nitride or the like was used as a material of the substrate 2.

EXAMPLE 2

Figure 5:
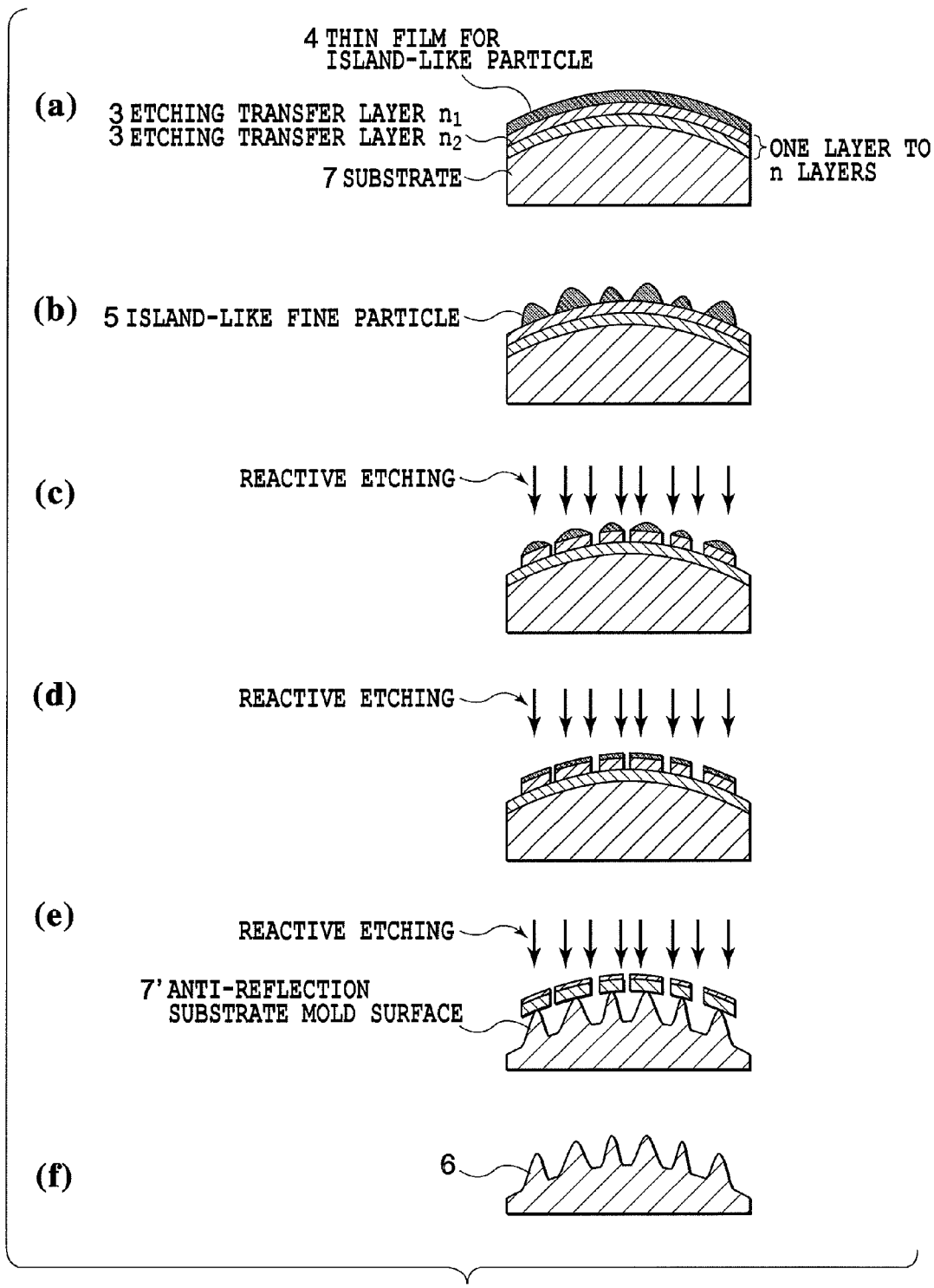
FIG. 5 is diagrams explaining Example 2 in the present invention.

FIG. 5 is diagrams explaining the steps carrying out the method of producing a mold 6 for an optical device according to Example 2 in the present invention by using the reactive ion etching method in the same way as in Example 1. Example 2 relates to a mold for an optical device for molding an optical device having a free curved surface, and differs in a point that a substrate 7 has the free curved surface, but since Example 2 has the same producing method as in Example 1, the explanation is omitted.

The mold 6 for the optical device obtained by the producing method according to Example 2 is provided with a substantially conical fine depressed and elevated surface (anti-reflection structure mold surface) 7' formed on a surface of a substrate 7, and can obtain the same effect as in Example 1 also in regard to the reflective characteristic.

(Producing Method of a Mold for Injection Molding and Molding for an Optical Device)

Figure 6:
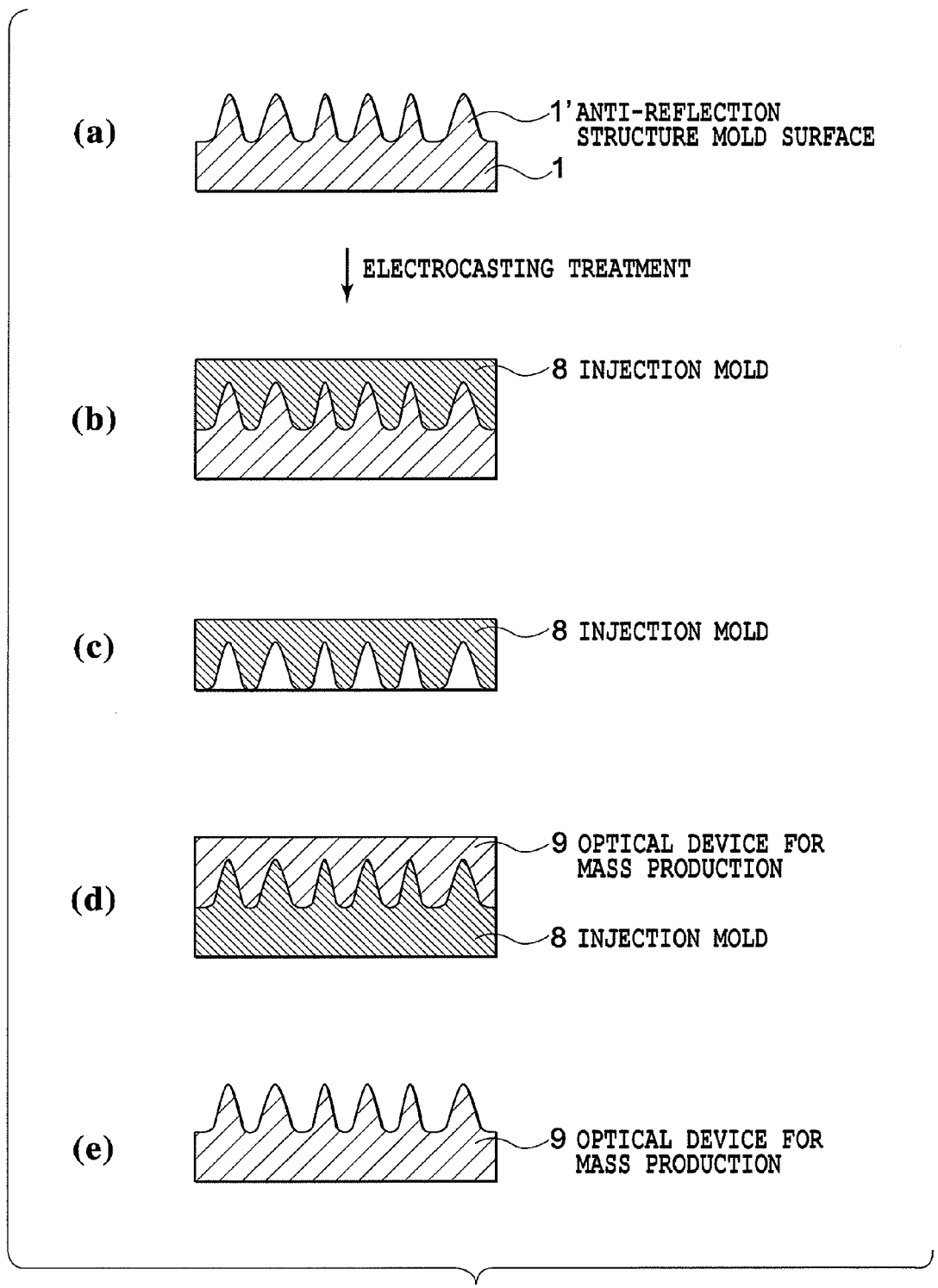
FIG. 6 is diagrams explaining production of an injection mold using a mold for an optical device, mold of an optical device, and an optical device in Example 1 of the present invention.

Next, using schematic diagrams shown in FIG. 6, a producing method of a mold for injection molding will be explained from the mold 1 for the optical device with the anti-reflection structure as explained above, and one example of a mass production method of the optical device with the anti-reflection structure by using the mold for the injection molding will be explained.

FIG. 6(a) shows the mold 1 for the optical device made of silicon (mold 1 for the optical device made of silica glass may be used) obtained by Example 1 in the present invention. The mold 1 for the optical device made of silicon is, as shown in FIG. 6(b), used to carry out regular nickel electro-casting treatment, thereby forming an injection mold 8 as shown in FIG. 6(c).

Next, using the injection mold 8, as shown in FIG. 6(d), an optical device 9 as shown in FIG. 6(e) can be mass-produced with the injection mold 8. This optical device 9 is provided with a nano pattern having a nano structure of fine depressed and elevated surface on the surface of the substrate and arranged at a random, preferably this nano pattern being composed of in such a manner as to hold an interval of a wavelength or less of a light source.

Specifically, it is preferable that the nano pattern of the optical device 9 is island-like and an average particle size thereof is in a range of 5 nm to 1000 nm and an average interval between the adjacent islands is in a range of 10 nm to 2000 nm.

Figure 7:
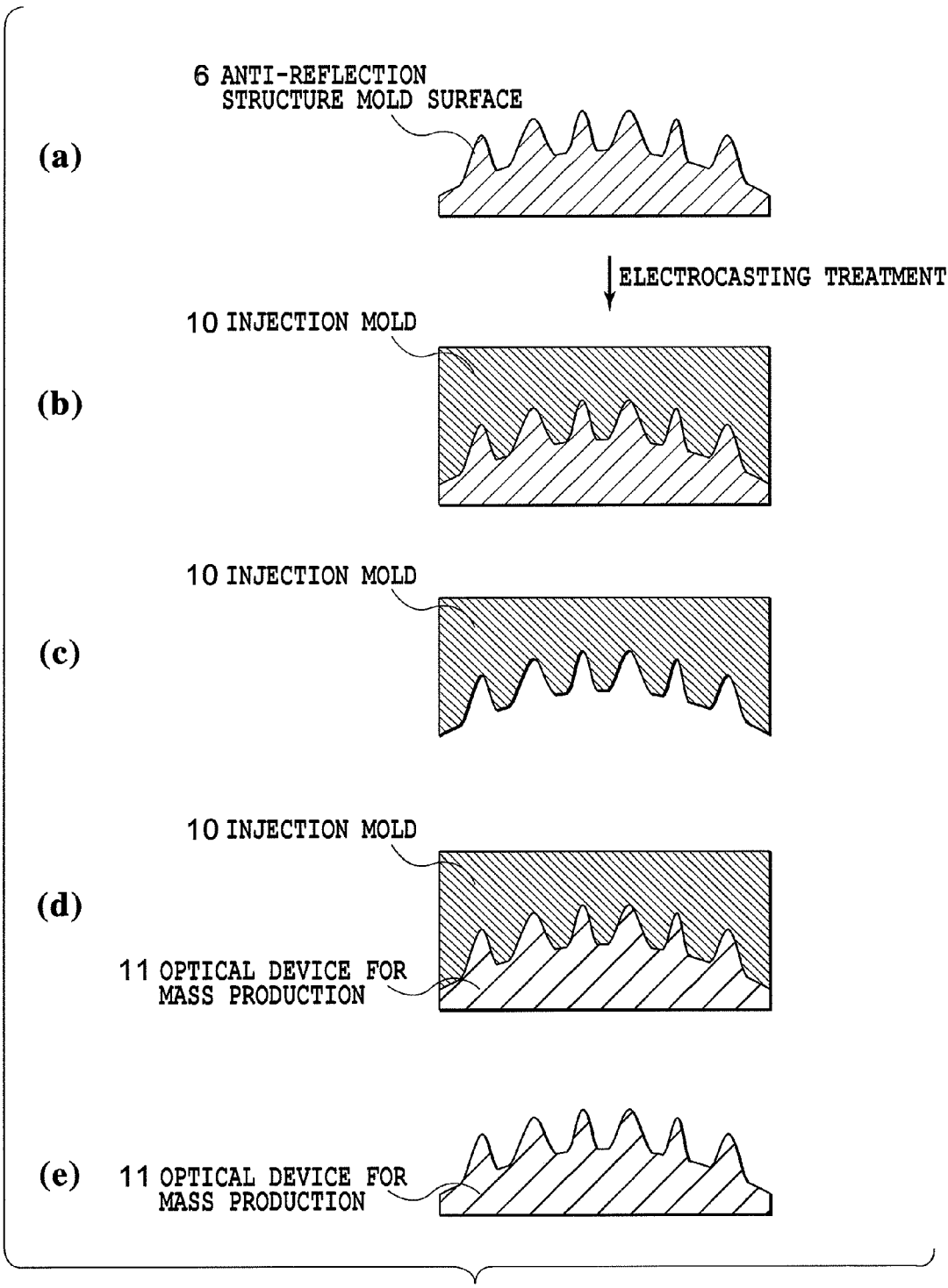
FIG. 7 is diagrams explaining manufacture of an injection mold using a mold for an optical device, mold of an optical device, and an optical device in Example 2 of the present invention.

FIG. 7 shows diagrams explaining a method using the mold 6 for the optical device (refer to FIG. 7(a)) obtained by Example 2 in the present invention. This method is exactly the same method as the method shown in FIG. 6, and the conventional nickel electro-casting treatment is carried out (refer to FIG. 7(b)), thereby forming an injection mold 10 (refer to FIG. 7(c)).

Further, using the injection mold 10, as shown, an optical device is injection-molded with the injection mold (refer to FIG. 7(d). The optical device 11 also (refer to FIG. 7(e)) can be mass-produced.

INDUSTRIAL APPLICABILITY

The present invention, since it is composed of as described above, can be applied to a general optical device (for example, lens for a projector, optical pickup, display or the like), a general light emitting device (for example, LED, laser or the like) and a general light acceptance device (photo diode, solar cell or the like).

What is claimed is:

1. A method of producing a mold for an optical device for molding the optical device with an anti-reflection structure of a fine depressed and elevated surface formed on a surface of a substrate, comprising:
    forming one or more etching transfer layers on the substrate;
    forming a thin film comprising a thin film material on the etching transfer layer;
    causing aggregation or nucleation of the thin film material to form a plurality of island-like fine particles composed of the thin film material by using a heating reaction or a photoreaction; and
    etching the etching transfer layer and the substrate in order, by using the plurality of island-like fine particles as a protection mask to form a fine elevated pattern on a surface of the etching transfer layer or the surface of the substrate.

2. A method of producing a mold for an optical device with an anti-reflection structure according to claim 1, wherein the plurality of island-like fine particles each have a size in the order of nano meters and form a nano pattern in such a manner as to be arranged at a random while holding an interval of a wavelength or less of light as a target, with each other.

3. A method of producing a mold for an optical device with an anti-reflection structure according to claim 1, wherein the thin film material is made of a material containing silver, gold, platinum, or palladium as a main component, or an oxide or a nitride containing any one of silver, gold, platinum, palladium, tungsten, bismuth, and tellurium as a main component.

4. A method of producing a mold for an optical device with an anti-reflection structure according to claim 1, wherein the plurality of the island-like fine particles has an average particle size of 5 nm to 1000 nm and an average interval between the plurality of island-like fine particles is in a range of 10 nm to 2000 nm.

5. A method of producing a mold for an optical device with an anti-reflection structure according to claim 1, wherein the substrate is made of a metal or a non-metal containing silica glass, resin, silicon, gallium nitride, gallium arsenide, indium phosphor, nickel, iron, titanium, carbon, sapphire or carbon nitride as a main component.

6. A method of producing a mold for an optical device with an anti-reflection structure according to claim 1, wherein the etching layer is composed of one layer made of an oxide, a nitride or a carbide, or multi layers made of any of the oxide, the nitride and the carbide.

7. A method of producing a mold, comprising:

forming one or more etching transfer layers on a substrate;

forming a thin film comprising a thin film material on the etching transfer layer;

causing aggregation or nucleation of the thin film material to form a plurality of island-like fine particles composed of the thin film material by using a heating reaction or a photoreaction; and etching the etching transfer layer and the substrate in order, by using the plurality of island-like fine particles as a protection mask to form a fine elevated pattern on a surface of the etching transfer layer or a surface of the substrate.

* * * * *